Figure 4:
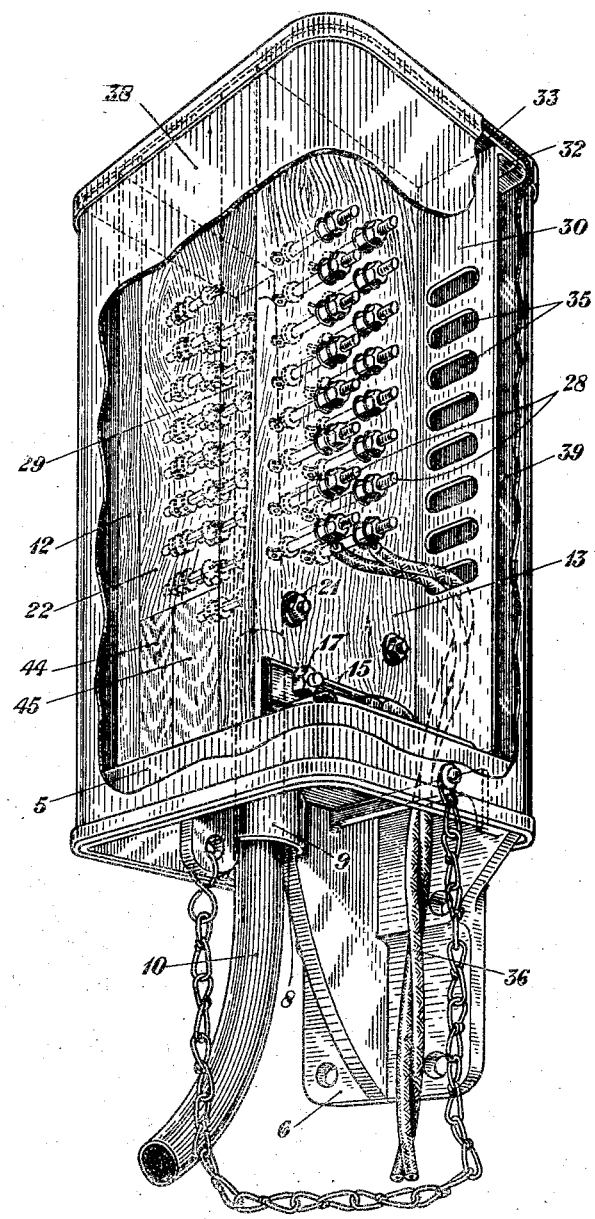

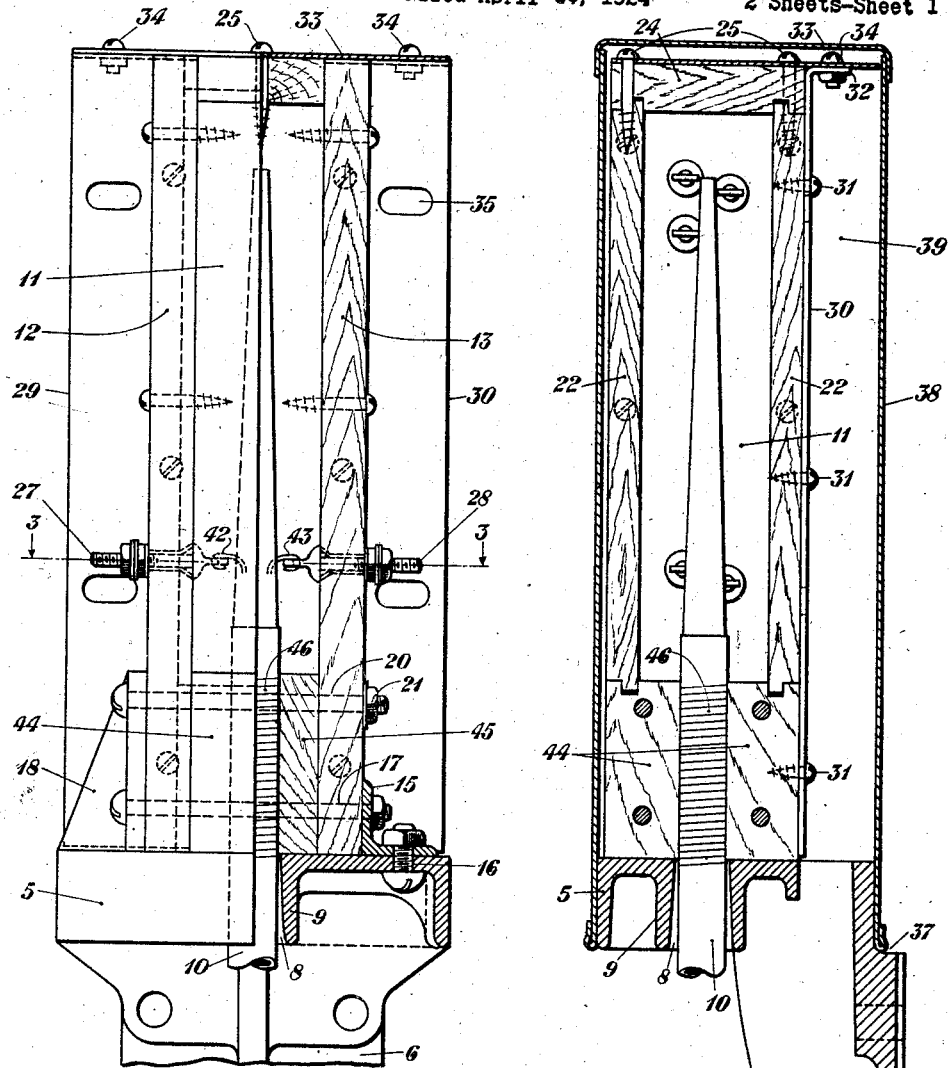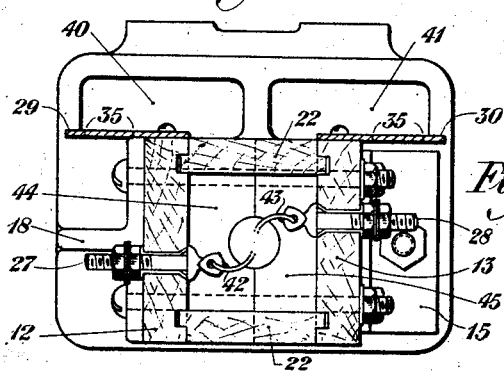

Patented Jan. 3, 1928.

1,654,657

UNITED STATES PATENT OFFICE.

EDGAR M. MATTHEWS, OF JAMAICA, NEW YORK, ASSIGNOR TO AMERICAN TELEPHONE AND TELEGRAPH COMPANY, A CORPORATION OF NEW YORK.

CABLE TERMINAL.

Application filed April 16, 1924. Serial No. 706,939.

This invention relates to cable terminals, and more particularly to structures of this character which are adapted to distribute conductors fanned out from electric cables.

An object of the invention is to provide a cable terminal whose interior shall be so tightly enclosed as to exclude dirt therefrom, and which shall be weatherproof to such a high degree as to be substantially unaffected by atmospheric or other elements detrimental thereto.

Another object is to provide a structure of this type which shall be compact and simple in design, and which shall require a minimum expense in its manufacture and maintenance.

Other and further objects of the invention will be apparent from the following description, when considered in connection with the accompanying drawings, in which one embodiment thereof is illustrated.

Referring to the drawings, Figure 1 is a front elevation of the cable terminal partly in section; Fig. 2 is a similar view in side elevation; Fig. 3 is a top plan view on the line 3—3 of Fig. 1, and Fig. 4 is a perspective view of the terminal with the cover partly broken away to show its interior.

In the drawings, the numeral 5 represents a base on which the elements of the cable terminal are mounted. The base 5 is of rectangular form, having its front and rear portions of longer dimensions than its sides, as may be more clearly indicated in Fig. 3. The base 5 may be composed of metal, such as cast iron, and on its rear side is provided with an integral depending bracket 6, having openings therein through which screws or bolts pass to rigidly secure it in position. An opening 8, having a flared tubular flange 9, is provided in the base 5, through which a cable 10 is led into the interior of the cable terminal. The opening 8 and flange 9 are so positioned in the rectangular base 5 as to permit the bending of the cable closely against the mounting bracket 6, so there will be no projecting loop in the cable.

The cable head comprises a vertical rectangular sealing chamber 11, in which the stub of the cable 10 terminates, is made up from wooden partitions, to be presently described. These are supported on the base 5, and suitably treated to resist moisture and provide high insulating characteristics.

A pair of parallel face panels 12 and 13 extend vertically from the base 5, and have longitudinal grooves provided near their outer edges. A pair of clamping blocks 44 and 45 are positioned on the base 5 between the lower portions of the face panels, and are provided with grooves at their tops in which fit two panels to be presently described. An angle iron 15, positioned on the base 5 at the bottom of the panel 13, has an opening in one of its legs coinciding with an alined opening in said base, through which a bolt 16 extends to secure the angle iron to the base. The other leg of the angle iron also has openings for the reception of cross bolts 17, which extend through openings in the bracket 18, positioned against the panel 12, and through horizontal holes in the panels 12 and 13 and also in the intermediate clamping blocks 44 and 45. The bracket 18 may be integral with the base 5 and extends upwardly therefrom. These bolts have nuts threaded on their ends and serve to retain said panels and clamping blocks in position. Additional cross bolts 20, having nuts 21 provided on their threaded ends, are spaced directly above the bolts 17 and extend through openings in the bracket 18 and through holes in the panels 12 and 13 and clamping blocks 44 and 45 in a manner similar to that of bolts 17. The bolts 20 cooperate with the bolts 17 in retaining the panels and clamping blocks in position. Side panels 22, which fit in the top grooves of the clamping blocks 44 and 45 and have their vertical tongues positioned in the longitudinal grooves of the face panels 12 and 13, serve with the clamping blocks 44 and 45 and face panels 12 and 13 to form the rectangular chamber 11 previously referred to. A cap piece 24 is attached to the top of this chamber and is provided with grooves which register with tongues on the side panels 22, and to more rigidly secure the portion 24 and side panels 22 to the face panels 12 and 13, screws 25 are introduced through the contiguous walls of these members at suitable intervals.

The face panels 12 and 13, comprising the two sides of the rectangular chamber 11, have perforations through which binding posts 27 and 28, respectively, extend. These binding posts may be arranged in two rows longitudinally of each panel in pairs. The inner row may be slightly staggered with respect to the outer row to facilitate the connection of drop wires thereto. The preferred type of binding post is disclosed in the L. W. Kelsey application, Serial No. 655,391, dated August 3, 1923. These binding posts are provided with tubular eyelets which extend through holes in the panels and have flanges positioned against the exterior faces thereof. Bolts which have enlarged heads are entered from the chamber 11 through the opposite sides of the panels and extend through the tubular eyelets and have nuts threaded on their ends. Washers are positioned on the bolts between the nuts in such manner as to hold electrical conductors in clamped position when the nuts are tightened.

The face panels 12 and 13 have fanning strips 29 and 30 attached to their rear edges. These fanning strips are preferably composed of sheet metal and extend longitudinally along the edges of said strips and are secured thereto by suitably spaced screws 31, which extend through holes provided in the fanning strips and enter the wooden face panels. The upper portions of the fanning strips are turned to form flanges 32, which are secured to a metal plate 33 by means of bolts 34. The metal plate 33 lies upon the cap piece 24, and is kept in position by the screws 25 which also extend through said cap piece as previously mentioned. The fanning strips extend outwardly beyond the face panels 12 and 13 so that their outer longitudinal edges lie in substantially the same vertical planes as the side edges of the base 5, as more clearly indicated in Fig. 1. Each fanning strip is provided with a series of holes 35, which in the present instance are shown as elliptical. For each pair of binding posts appearing upon the face panels 12 and 13, a hole is provided in the fanning strips at a point preferably slightly below the horizontal plane of such binding posts, as may be more clearly seen in Fig. 4 of the drawings. The arrangement of the holes 35 in this manner facilitates connections of drop wires 36 with the binding posts, as will presently appear. The surface provided by the plate 33 on the top of the chamber 11 cooperates with the shoulder 37, formed on the rear of the base 5, to support a rectangular cover 38. The cover 38 is of such dimensions as to fit snugly over the outer longitudinal edges of the fanning strips 29 and 30, and these serve as a guide for said cover and also co-act therewith to form a chamber 39 in the rear part of the cable terminal to house the drop wires 36. When the cover is in position its lower edge is flush with the bottom of the base 5 and forms a tight closure therewith. The cover 38 may be attached to the base 5 by a short chain which serves to hold said cover suspended when it is removed from its position. Openings 40 and 41 are provided in the rear of the base 5 through which the drop wires may enter the chamber 39 formed by the fanning strips and cover 38.

The cable 10 extends into the interior of the cable terminal through the tubular flange 9 and its conductors 42 and 43 are fanned out in pairs and soldered to heads of the binding posts appearing on the interior walls of the side panels. The cable 10 may be rigidly held in place by the two clamping blocks 44, 45 each provided with a channel which, when the blocks are placed together, provide an opening slightly larger in diameter than the cable, so that when the cable is in position in the chamber 11 and wrapped with friction tape 46, and the panels 22 are in place, the tightening of the cross bolts 17 and 20, rigidly clamps the cable 10, thereby relieving all strain. The friction tape 46 functions with the cable to tightly close the opening into the chamber, and prevents the entrance of moisture. In practice it is customary after the above operations are performed to fill the chamber with an insulating and sealing compound to more completely weatherproof the cable head.

The drop wires, as previously pointed out, are introduced through the openings 40 and 41 in the base 5 and are extended upwardly through the rear chamber 39 and through the openings 35 in the fanning strips 29 and 30 and clamped in pairs to parallel binding posts. It is pointed out that by placing all the wooden portions and joints above the base and enclosing them in a weatherproof housing formed by the base and cover, as outlined above, the enclosed elements including the binding posts and bolts are fully protected from dirt and are substantially unaffected by atmospheric conditions.

What is claimed is:

1. A cable terminal comprising a base member having a rectangular head supported thereon, clamping means associated with said head, said clamping means comprising adjacent blocks having co-operating channels forming a surface for engaging a cable whereby said blocks coact under pressure to rigidly hold the cable in position, the base member and said clamping means having alined openings whereby a cable may enter said cable head and be sealed therein against moisture by the tight closure provided by the clamping means, terminals extending through parallel sides of the cable head in pairs in substantially horizontal alinement to which the individual pairs of conductors of said cable may be directly connected to drop wires, a rectangular cover registering with the rectangular vertical sides of the base to form a weatherproof enclosure for said cable head, and fanning members affixed to said cable head and extending outwardly from the sides thereof to serve as guides for said cover and forming therewith and the back of said cable head a chamber for the pairs of drop wires connected to the individual pairs of conductors of said cable, said fanning members having openings whereby the drop wires may be led directly from their chamber to the horizontally alined pairs of terminals on the parallel sides of said cable head and said base having openings rearwardly of and beneath said chamber whereby said drop wires may be brought out.

2. In a cable terminal, a base member, a rectangular head supported thereon, said head member being composed of material to resist moisture and provide high insulation, clamping means associated with said head member, said clamping means comprising adjacent blocks having co-operating channels forming a surface for engaging a cable whereby said blocks coact under pressure to hold the cable in position, said base member and clamping means having alined openings whereby a cable may enter said cable head and be sealed therein against moisture by the tight closure provided by the clamping means, terminals extending through parallel sides of the cable head in pairs in substantially horizontal alinement to which the individual pairs of conductors of said cable may be directly connected to drop wires, a rectangular cover registering with the vertical sides of the base to form a weatherproof enclosure for said cable head, and fanning members affixed to said cable head and extending outwardly from the side thereof to serve as guides for said cover and forming therewith and the back of said cable head a chamber for drop wires, said fanning members having openings whereby the drop wires may be led directly from their chamber to the individual pairs of terminals to make direct connection therethrough with the individual pairs of cable conductors and said base having openings beneath said chamber whereby said drop wires may be brought out.

In testimony whereof, I have signed my name to this specification this 12th day of April, 1924.

EDGAR M. MATTHEWS.